United States Patent

[11] 3,551,662

[72] Inventor Gerald W. Price
Huntsville, Ala.

[21] Appl. No. 601,812
[22] Filed Dec. 14, 1966
[45] Patented Dec. 29, 1970
[73] Assignee the United States of America as represented by the Secretary of the Army

[54] SQUARE ROOT APPARATUS
1 Claim, 3 Drawing Figs.

[52] U.S. Cl. .......... 235/158
[51] Int. Cl. .......... G06f 7/38, G06f 1/04
[50] Field of Search .......... 235/158

[56] References Cited

UNITED STATES PATENTS

| | | | |
|---|---|---|---|
| 2,751,149 | 6/1956 | Young et al. | 235/158 |
| 2,888,200 | 5/1959 | Weiss | 235/158 |
| 3,280,314 | 10/1966 | Weigler | 235/158 |

OTHER REFERENCES

Lenaerts, E.H. Automatic Square Rooting. In electronic engineering. 27 (329): pp. 287— 289. July 1955. TK6630A2T2.

*Primary Examiner*—Eugene G. Botz
*Assistant Examiner*—R. Stephen Dildine, Jr.
*Attorneys*—Harry M. Saragovitz, Edward J. Kelly, Herbert Berl and Aubrey J. Dunn

ABSTRACT: The apparatus includes a number register in which the number whose square root is desired is entered. In response to signals from a control section, a constants generator provides successive integers. The successive odd integers are subtracted, in an adder-subtractor, from the number, until a change of sign of the remainder is detected by sign-of-number detector. The number of subtractions necessary before the change of sign of the remainder is accumulated in an answer register. An inhibit circuit is included to exclude even integers from the adder-subtractor. The adder-subtractor, sign-of-number detector, inhibit circuit, number register, and answer register are all controlled by the control section.

Gerald W. Price,
INVENTOR.
BY Harry M. Saragovitz
Edward J. Kelly
Herbert Berl
Aubrey J. Dunn Gerald W. Price,
INVENTOR BY Harry M. Saragovitz
Edward J. Kelly
Herbert Berl
Aubrey J. Dunn

SQUARE ROOT APPARATUS

This invention relates to a method and apparatus for computing the square roots of binary numbers.

Heretofore, the computation of square roots with a general purpose computer has been a long and complicated process. One way in which this might be accomplished is by storing (in binary form) a number "b," whose square root is desired, in a storage position of the computer, and storing, in another position, a binary number "x." The number "x" is squared and the resulting product is subtracted from "b." If the difference $(b-x)$ is positive, a binary "1" is added to the most significant position of "x," and "x" is again squared and subtracted from "b." When the sign of the difference between "b" and "$x^2$" becomes negative, the square root of "b" obviously must lie between the present value of "x" and $(x-1)$. The next least significant binary position of "x" would be treated in like manner. If the original difference between "b" and "$x^2$" had been negative, a binary "1" would have been subtracted from "x," and "x" would be again squared, etc.

My invention takes advantage of the fact that the square of a particular integer may be obtained by adding that particular number of successively increasing integers in the ordinary sequence of odd numbers. For example, the square of 4 is obtained by adding the first four successive odd integers, i.e.:

$$4^2=1+3+5+7=16$$

The converse of this is obviously true. The extraction of the square root is a process of subtracting, in order, the sequence of odd integers. To find the square root of 16, we proceed as follows:

| | |
|---|---|
| 16 | |
| −1 | 1 |
| 15 | |
| −3 | 2 |
| 12 | |
| −5 | 3 |
| 7 | |
| −7 | 4 |
| 0 | |

It can be seen from the above that four subtractions of successive odd integers were necessary to reach a difference of zero. Therefore, by this method, the square root of 16 is found to be 4.

For numbers which are not exact squares, the process becomes more difficult.

Using the above process, the square root of 3 would be found as follows:

| | |
|---|---|
| 3 | |
| −1 | 1 |
| 2 | |

Only one odd number can be subtracted from 3 without the difference being less than the next succeeding odd number (3). It can be seen that the square root of 3, to one decimal place, is "1," with a remainder. If it is desired to get greater accuracy, 300 could be used instead of 3. The square root process would proceed as follows:

| | |
|---|---|
| 300 | |
| −1 | 1 |
| 299 | |
| −3 | 2 |
| 296 | |
| −5 | 3 |
| 291 | |
| −7 | 4 |
| 284 | |
| −9 | 5 |
| 275 | |
| −11 | 6 |
| 264 | |
| −13 | 7 |
| 251 | |
| −15 | 8 |
| 236 | |
| −17 | 9 |
| 219 | |
| −19 | 10 |
| 200 | |
| −21 | 11 |
| 179 | |
| −23 | 12 |
| 156 | |
| −25 | 13 |
| 131 | |
| −27 | 14 |
| 104 | |
| −29 | 15 |
| 75 | |
| −31 | 16 |
| 44 | |
| −33 | 17 |
| 11 | |

It can be seen that 17 subtractions of successive odd integers are necessary before the difference is less than the next successive odd integer (35); or, the square root is 17. In order to take the square root to another decimal place, 30,000 could be used, and 173 subtractions would be necessary before a difference less than the next successive odd number. This process rapidly gets out of hand if six or seven place accuracy is required.

The number of steps to find a square root can be reduced if the following process is used. When the remainder after a subtraction is less than the next odd number, the remainder is multiplied by 100; the partial root is doubled and multiplied by 10 and 1 is added to the product. The resulting number is taken as the first number in a new series of odd numbers. A specific example, such as the square root of 3, is of help in understanding this method.

| | | | |
|---|---|---|---|
| Thus | 3 | | |
| | −1 | 1 | (Partial root). |
| (Multiply remainder by 100) | 200 | | |
| (Partial root doubled, multiplied by 10 and with 1 added) | −21 | 1 | |
| | 179 | | |
| | −23 | 2 | |
| | 156 | | |
| | −25 | 3 | |
| | 131 | | |
| | −27 | 4 | |
| | 104 | | |
| | −29 | 5 | |
| | 75 | | |
| | −31 | 6 | |
| | 44 | | |
| | −33 | 7 | (Square root is now 17 or 1.7). |
| | 1,100 | | |
| (2×17×10)+1 | −341 | 1 | |
| | 759 | | |
| | −343 | 2 | |
| | 416 | | |
| | −345 | 3 | (Square root now reads 173 or 1.73). |
| | 7,100 | | |
| | −3,461 | 1 | |
| | 3,639 | | |
| | −3,463 | 2 | (Square root now reads 1732 or 1.732). |
| | 176 | | |

The number which should now be subtracted from 17,600 (176 × 100) is ((1.732 × 2 × 10) + 1), or 34.641. Such a subtraction is not acceptable, since it would result in a negative remainder, and a zero becomes part of the square root. The square root is now 17,320 or 1.7320.

17,600 is again multiplied by 100 to give 1,760,000, and 17,320 is doubled and multiplied by 10 and 1 is added to give 346,401.

Then:

| | |
|---|---|
| 1, 760, 000 | |
| −346, 401 | 1 |
| 1, 413, 599 | |
| −346, 403 | 2 |
| 1, 067, 196 | |
| −346, 405 | 3 |
| 720, 791 | |
| −346, 407 | 4 |
| 374, 384 | |
| −346, 409 | 5 |
| 27, 975 | |

Thus the square root of 3 is 1.73205. It is obvious that this process requires very few subtractions, compared to the previous process described.

This last process or method may be applied to the extraction of a square root of a binary number. Certain modifications are necessary in modulo 2 systems as the highest order of the odd series of numbers is the odd "1." Only one subtraction for each binary square root grouping would be required. If this subtraction is accomplished without changing the sign of the minuend, then a binary "one" is indicated for that grouping's contribution to the final square root answer. This general procedure is repeated for each subsequent square root grouping, except there are particular changes that must be generated for later decades. For the second subtrahend, the answer obtained thus far is doubled and placed beside the odd series bit position in most significant position. As this odd series bit is always a "1," the new subtrahend is the answer doubled and placed along with the integer "1" in the less significant position. Each succeeding subtrahend is generated by doubling the previous answer and placing this with the new odd bit with the doubled answer in the more significant position. After subtraction, if the sign of the minuend has changed, the minuend must be restored by adding the subtrahend back to the minuend. These procedures can be noted in detail in the following example. In this example, the square root of 990,025 is extracted.

| | 1 | 1 | 1 | 1 | 1 | 0 | 0 | 0 | 1 | 1 |
|---|---|---|---|---|---|---|---|---|---|---|
| | 11 | 11 | 00 | 01 | 10 | 11 | 01 | 00 | 10 | 01 |
| (1) Sub | 01 | 00 | 00 | 00 | 00 | 00 | 00 | 00 | 00 | 00 |
| | 10 | 11 | 00 | 01 | 10 | 11 | 01 | 00 | 10 | 01 |
| (2) Circulate | 00 | 00 | 00 | 00 | 00 | 00 | 00 | 00 | 00 | 00 |
| | 10 | 11 | 00 | 01 | 10 | 11 | 01 | 00 | 10 | 01 |
| (3) Sub | 01 | 01 | 00 | 00 | 00 | 00 | 00 | 00 | 00 | 00 |
| | 01 | 10 | 00 | 01 | 10 | 11 | 01 | 00 | 10 | 01 |
| (4) Circulate | 00 | 00 | 00 | 00 | 00 | 00 | 00 | 00 | 00 | 00 |
| | 01 | 10 | 00 | 01 | 10 | 11 | 01 | 00 | 10 | 01 |
| (5) Sub | 00 | 11 | 01 | 00 | 00 | 00 | 00 | 00 | 00 | 00 |
| | 00 | 10 | 11 | 01 | 10 | 11 | 01 | 00 | 10 | 01 |
| (6) Circulate | 00 | 00 | 00 | 00 | 00 | 00 | 00 | 00 | 00 | 00 |
| | 00 | 10 | 1 | 01 | 10 | 11 | 01 | 00 | 10 | 01 |
| (7) Sub | 00 | 01 | 11 | 01 | 00 | 00 | 00 | 00 | 00 | 00 |
| | 00 | 01 | 00 | 00 | 10 | 11 | 01 | 00 | 10 | 01 |
| (8) Circulate | 00 | 00 | 00 | 00 | 00 | 00 | 00 | 00 | 00 | 00 |
| | 00 | 01 | 00 | 00 | 10 | 11 | 01 | 00 | 10 | 01 |
| (9) Sub | 00 | 00 | 11 | 11 | 01 | 00 | 00 | 00 | 00 | 00 |
| | 00 | 00 | 00 | 01 | 01 | 11 | 1 | 00 | 10 | 01 |
| (10) Circulate | 00 | 00 | 00 | 00 | 00 | 00 | 00 | 00 | 00 | 00 |
| | 00 | 00 | 00 | 01 | 01 | 11 | 01 | 00 | 10 | 01 |
| (11) Sub | 00 | 00 | 01 | 11 | 11 | 01 | 00 | 00 | 00 | 00 |
| | 11 | 11 | 10 | 01 | 10 | 10 | 01 | 00 | 10 | 01 |
| (12) Add | 00 | 00 | 01 | 11 | 11 | 01 | 00 | 00 | 00 | 00 |
| | 00 | 00 | 00 | 01 | 01 | 11 | 01 | 00 | 10 | 01 |
| (13) Sub | 00 | 00 | 00 | 11 | 11 | 10 | 01 | 00 | 00 | 00 |
| | 11 | 11 | 11 | 01 | 0 | 01 | 00 | 00 | 10 | 01 |
| (14) Add | 00 | 00 | 00 | 11 | 11 | 10 | 01 | 00 | 00 | 00 |
| | 00 | 00 | 00 | 01 | 01 | 11 | 01 | 00 | 10 | 01 |
| (15) Sub | 00 | 00 | 00 | 01 | 1 | 11 | 00 | 01 | 00 | 00 |
| | 11 | 11 | 11 | 11 | 10 | 00 | 00 | 11 | 10 | 01 |
| (16) Add | 00 | 00 | 00 | 01 | 11 | 11 | 00 | 01 | 00 | 00 |
| | 00 | 00 | 00 | 01 | 01 | 11 | 01 | 00 | 10 | 01 |
| (17) Sub | 00 | 00 | 00 | 00 | 11 | 11 | 10 | 00 | 01 | 00 |
| | 00 | 00 | 00 | 00 | 01 | 11 | 11 | 00 | 01 | 01 |
| (18) Circulate | 00 | 00 | 00 | 00 | 00 | 00 | 00 | 00 | 00 | 00 |
| | 00 | 00 | 00 | 00 | 01 | 11 | 11 | 00 | 01 | 01 |
| (19) Sub | 00 | 00 | 00 | 00 | 01 | 11 | 11 | 00 | 01 | 01 |
| | 00 | 00 | 00 | 00 | 00 | 00 | 00 | 00 | 00 | 00 |
| (20) Circulate | 00 | 00 | 00 | 00 | 00 | 00 | 00 | 00 | 00 | 00 |

EXAMPLE

The binary number is set off in groups of two, as is required by any square root operation, from the least significant digit. The subtrahend, 01 00 00 00 00 00 00 00 00 00, which is equivalent to subtracting the binary "1" from the most significant group of the minuend, is subtracted. The remainder, 10 11 00 01 10 11 01 00 10 01, is still of the same sign as the subtrahend was not larger than the minuend, and therefore, a "1" digit is placed in the answer position for the most significant group. As the sign did not change, the restoring step is not required and a circulation without change is indicated. The next subtrahend is determined by doubling the previous answer, shifting down one bit, and placing this beside the odd series "1," i.e.,

| | |
|---|---|
| 1 | answer register, |
| 10 | doubled answer, |
| 01 0 | shift doubled answer, |
| 01 01 | placed with odd series "1", |

and the new subtrahend is 01 01 00 00 00 00 00 00 00 00. The procedure is continued through step No. 11, where the sign changes and the restoring addition of the subtrahend is performed. As the result of the appearance of the negative number, the answer for that grouping is "0," i.e., 1 1 1 1 1 0 ---. The sign continues to be negative through step No. 13 and No. 15 for additional zeros. The sign remains positive for steps No. 17 and No. 19 for a final answer of 1 1 1 1 1 0 0 0 1 1. This is the number 995 and is the correct answer to the square root of 990,025.

An apparatus for performing the method must have, at least, some means for generating a series of successive odd integers, an arithmetic unit in which to perform the various arithmetic operations, and registers in which to store the various numbers.

BRIEF DESCRIPTION OF THE DRAWINGS

Referring now to FIG. 1, the inventive apparatus is seen to consist of a number register 1, into which is entered the number whose square root is desired. A constants generator 2 generates the subtrahend and retains it for the possibility of restoring the minuend if the remainder is negative. An adder-subtractor 3 performs the addition and subtraction operations. An element 4 senses the sign of the number and governs whether an addition or subtraction is performed. The answer register 5 stores the answer. The even-word inhibit element 6 insures that only odd numbers (words) are used in adder-subtractor element 3. The overall operation of the circuit is controlled and coordinated by a control section 7. This control section can take anyone of several forms. The requirement is for a circuit capable of providing a repetitive decimal count on respective output lines. One example of such a circuit might include a clock feeding a binary counter, with a binary-to-decimal converter connected to the counter. Such a circuit is shown in the "Instruction Manual for 200–KC S-PAC Digital Modules" of Aug. 5, 1963, by Computer Control Company, Inc., of Massachusetts, Mass., on page 3—174, in FIG. 3-26.6. This circuit provides a decimal count only to 15, but could obviously be extended to any desired number. The general arrangement of this circuit is shown in FIG. 2, wherein 21 designates the clock, 22 designates the binary counter, and 23 designates the binary-to-decimal converter. As can be seen, converter 23 has outputs 24.

Figure 1:
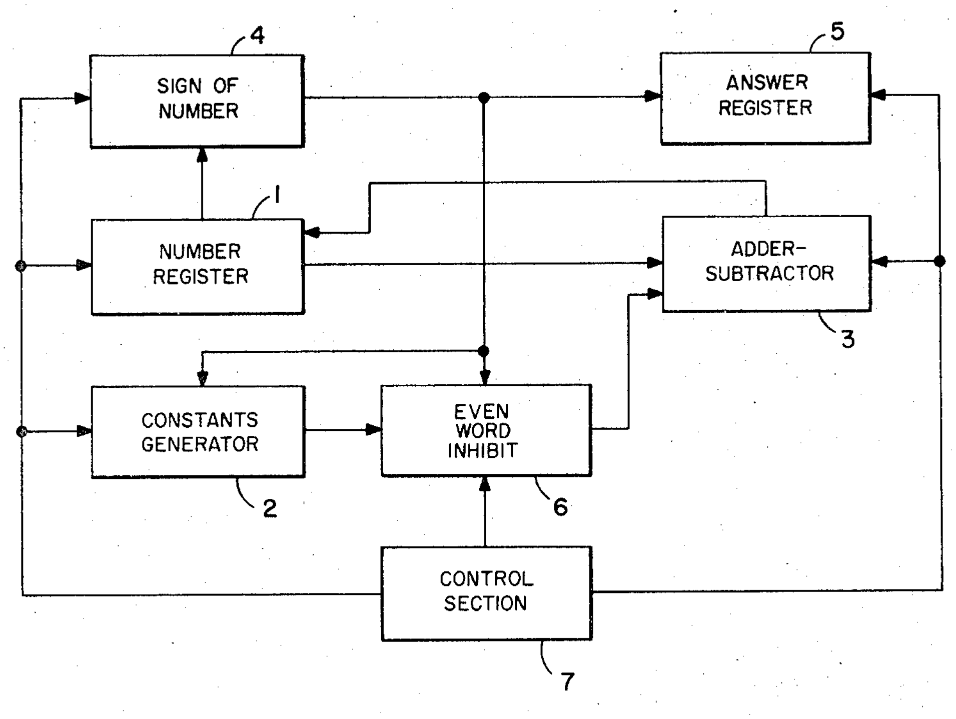
FIG. 1 shows a schematic diagram of the invention.
Figure 3:
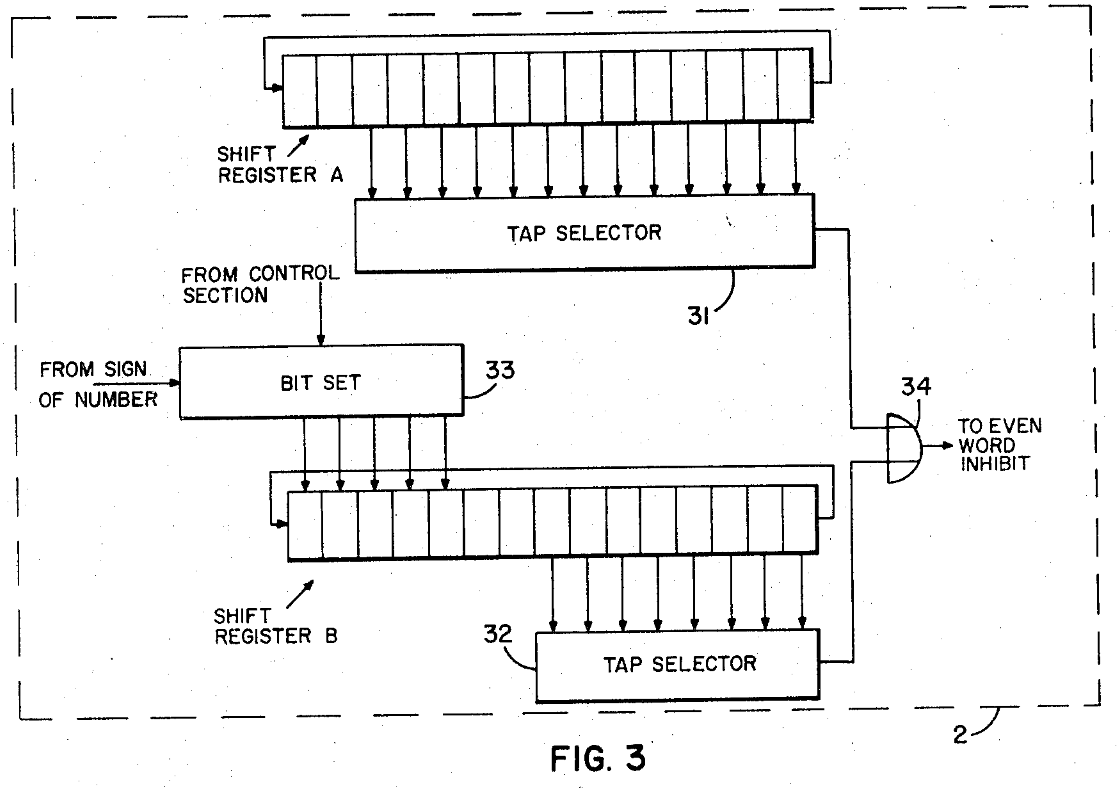
FIG. 3 shows details of element 2 of FIG. 1.
Figure 2:
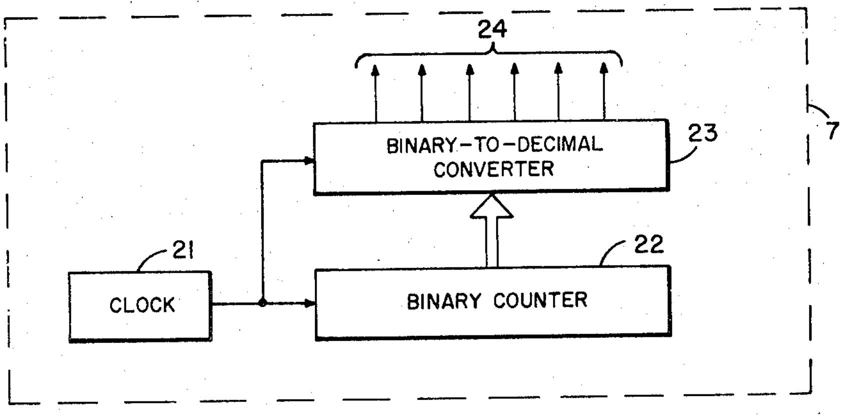
FIG. 2 shows details of element 7 of FIG. 1.

The constants generator consists of two shift registers A and B with tap selectors for each. The binary number 01000000000000000000 is set in shift register A and this number is never changed or removed, but is circulated in the register during each word. The constants generator can generate this number (01000000000000000000) on the first and second word of each solution by tap selector 31 taking the number from the last bit of this register. The 01 in the first two bits of this number moves over to the right two bits on each odd word (see solution No. 2 of table I and the previous problem example). This is accomplished in shift register A by moving the tab selector over two bits on each odd word.

The other part of the constant is generated in second shift register B. There is nothing set in this register at the beginning of a solution. At the end of each word, a 1 or 0 is set in the next bit, starting with bit number 2, depending on whether the number in the number register is positive or negative, respectfully. This is accomplished in bit set portion 33 of the constants generator. On each odd word after the bits are set in the second shift register, they must be shifted one bit to the right before the next subtraction (see table 1). This is accomplished by moving tap selector 32 over to the left one bit on each odd word starting with word number 3.

The output of first shift register A and of second shift register B is combined at the output of the constants generator by OR gate 34 and when the output of either register is a 1, the output of the constants generator is a 1.

provided to inhibit the word from going into the adder-subtractor (see even word inhibit block in FIG. 1) when the remainder does not go negative on the first word.

For the third word, the constants generator must generate 00010000000000000000 or 01010000000000000000 to be subtracted from the number and depends on whether the number was negative or positive, respectfully, at the end of the first word.

From the discussion and table I, it can be seen that the constants generator always generates the same number on the first and second words of any solution, and that it generates a new number on every odd word and holds this number through the next even word. This new number that is generated on every odd word, is determined by the sign of the previous odd number.

Each of the blocks of the drawing is known in the art, and the invention is to be the novel combination of these blocks. This inventive combination may be built as a special-purpose computer, of a general-purpose computer may be programmed to operate like the inventive combination.

While the method has been described as applicable to binary and decimal number systems, the technique is usable with any modulo, as long as the number is expressed as a positional number. The square roots of fractional numbers can be determined by converting the fraction to a corresponding positional number or by finding the square root of the numerator and denominator separately.

TABLE 1

| | Solution No. 1 | | Solution No. 2 | | Solution No. 3 | |
|---|---|---|---|---|---|---|
| Word No. | Sign of No. | Constants Generator | Sign of No. | Constants Generator | Sign of No. | Constants Generator |
| 1 | + | 01000000000000000000 | − | 01000000000000000000 | + | 01000000000000000000 |
| 2 | | 01000000000000000000 | | 01000000000000000000 | | 01000000000000000000 |
| 3 | + | 01010000000000000000 | − | 00010000000000000000 | + | 01010000000000000000 |
| 4 | | 01010000000000000000 | | 00010000000000000000 | | 01010000000000000000 |
| 5 | + | 00110100000000000000 | − | 00000100000000000000 | + | 00110100000000000000 |
| 6 | | 00110100000000000000 | | 00000100000000000000 | | 00110100000000000000 |
| 7 | + | 00011101000000000000 | − | 00000001000000000000 | + | 00011001000000000000 |
| 8 | | 00011101000000000000 | | 00000001000000000000 | | 00011001000000000000 |
| 9 | + | 00001111010000000000 | − | 00000000010000000000 | + | 00001101010000000000 |
| 10 | | 00001111010000000000 | | 00000000010000000000 | | 00001101010000000000 |
| 11 | + | 00000111110100000000 | − | 00000000000100000000 | + | 00000110100100000000 |
| 12 | | 00000111110100000000 | | 00000000000100000000 | | 00000110100100000000 |
| 13 | + | 00000011111101000000 | − | 00000000000001000000 | + | 00000011010001000000 |
| 14 | | 00000011111101000000 | | 00000000000001000000 | | 00000011010001000000 |
| 15 | + | 00000001111111010000 | − | 00000000000000010000 | + | 00000001101001010000 |
| 16 | | 00000001111111010000 | | 00000000000000010000 | | 00000001101001010000 |
| 17 | + | 00000000111111110100 | − | 00000000000000000100 | + | 00000000110100110100 |
| 18 | | 00000000111111110100 | | 00000000000000000100 | | 00000000110100110100 |
| 19 | + | 00000000011111111101 | − | 00000000000000000001 | + | 00000000011010011101 |
| 20 | | 0000000001111111101 | | 00000000000000000001 | | 00000000011010011101 |

Table I is a table of constants that must be generated for the word number indicated. The number that must be generated is determined by the sign of the number in the number register. Solution No. 1 shows the numbers the constants generator would have to generate if the subtraction never caused the remainder to go negative. In solution No. 2, the subtraction always causes the remainder to go negative and solution No. 3 is an example that combines positive and negative numbers.

It can be observed from table I that on the first word of every solution, the constants generator must generate 0100000000000000000 to be subtracted from the number in the number register. If this subtraction causes the remainder to go negative, then on the second word the constants generator must generate 01000000000000000000 to be added back to the number. If the number does not go negative on the first word, a simple circulation is performed. Therefore, the constants generator can always generate a 0100000000000000000 on the second word and a block be

I claim:

1. A computer for computing square roots of numbers, including; an input register for said numbers, having an input and outputs; a constants generator having an input and an output; arithmetic means having inputs and an output; means to inhibit even constants having inputs and an output, with a first of its inputs connected to the output of said constants generator and its output connected to a first input of said arithmetic means; a first output of said input register connected to a second input of said arithmetic means; an answer register; a sign of number detector having an input connected to a second output of said input register, and having an output connected to said answer register, to said input of said constants generator, and to a second input of said means to inhibit; said output of said arithmetic means connected to said input of said input register; and control means connected to each input register, constants generator, arithmetic means, means to inhibit, answer register, and sign-of-number detector.